United States Patent [19]
Ishihara

[11] Patent Number: 4,513,406
[45] Date of Patent: Apr. 23, 1985

[54] POSITIONING SERVO CIRCUIT FOR A DISK SYSTEM

[75] Inventor: Atsushi Ishihara, Yokohama, Japan

[73] Assignee: Tokyo Shibaura Denki Kabushiki Kaisha, Kawasaki, Japan

[21] Appl. No.: 373,785

[22] Filed: Apr. 30, 1982

[30] Foreign Application Priority Data

May 1, 1981 [JP] Japan ............................ 56-66472

[51] Int. Cl.³ ............................................. G11B 7/00
[52] U.S. Cl. ........................................ 369/32; 369/44
[58] Field of Search ...................... 369/43, 44, 111, 32;
358/322, 338, 342; 360/77, 75

[56] References Cited

U.S. PATENT DOCUMENTS

| 3,391,255 | 7/1968 | Gregg . | |
|---|---|---|---|
| 3,696,354 | 10/1972 | Palombo et al. . | |
| 3,721,882 | 3/1973 | Helms . | |
| 4,096,579 | 6/1978 | Black et al. . | |
| 4,123,779 | 10/1978 | Goldschmidt | 358/338 |
| 4,135,217 | 1/1979 | Jacques et al. . | |
| 4,142,209 | 2/1979 | Hedlund et al. | 358/342 |
| 4,160,270 | 7/1979 | Goldschmidt et al. | 360/77 X |
| 4,381,526 | 4/1983 | McLaughlin et al. | 360/77 X |
| 4,388,713 | 6/1983 | Tatsuguchi | 369/111 X |
| 4,390,977 | 6/1983 | Onigata et al. | 358/338 X |
| 4,403,259 | 9/1983 | Masaki | 369/32 |

FOREIGN PATENT DOCUMENTS 2197174 3/1974 France .
2034080 5/1980 United Kingdom .

Primary Examiner—Donald McElheny, Jr.
Attorney, Agent, or Firm—Cushman, Darby & Cushman

[57] ABSTRACT

The invention provides a disc device having a disc with a spiral data recording area, a motor for driving the disc, a head for recording data on the disc, reproducing it therefrom and erasing it thereon, a movable mechanism for radially moving the head on the disc, a positioning servo circuit for controlling and driving the movable mechanism, and a microprocessor for controlling the positioning servo circuit. A counter is included in the positioning servo circuit. The counter counts rotation synchronizing clock signals from the motor and outputs a predetermined reference position signal. In accordance with an output signal from the counter, the movable mechanism is driven at the same velocity as that at which the data recording area of the disc is moved in the movement direction of the movable mechanism.

4 Claims, 3 Drawing Figures

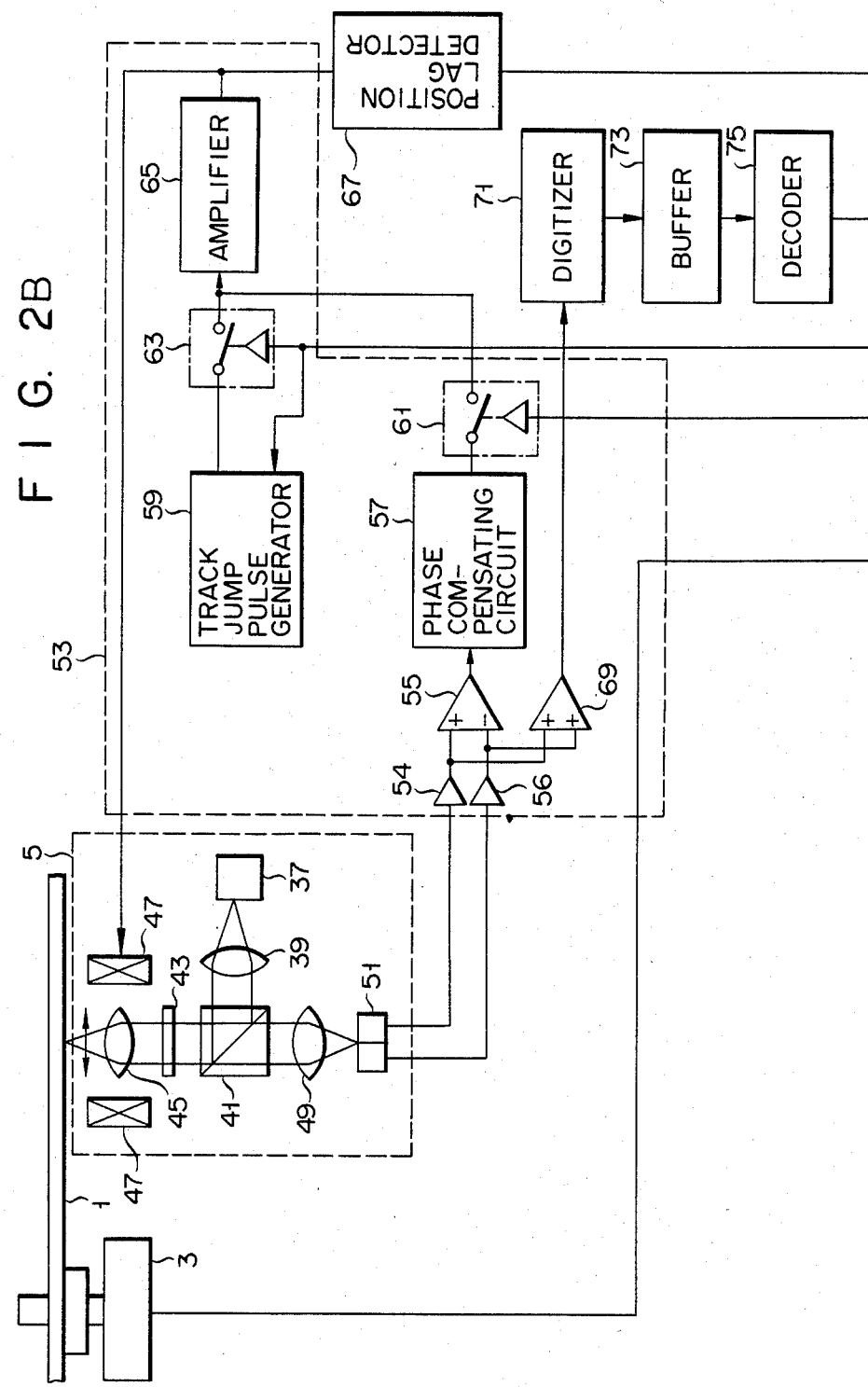

POSITIONING SERVO CIRCUIT FOR A DISK SYSTEM

BACKGROUND OF THE INVENTION

The present invention relates to a disc device for recording data spirally on an optical disc, reproducing it therefrom or erasing it.

Image data storage/retrieval devices have recently developed. These devices photoelectrically convert image data such as a number of documents by one-dimensional optical scanning. Converted image data is stored in an image memory device. The data is retrieved from the image memory device and reproduced as a hard copy or soft copy as needed. Optical disc devices are recently used for the image data storage/retrieval devices of this type.

In a conventional optical disc device, an optical disc is used on which data is recorded in a spiral shape. An optical head which is linearly movable in the radial direction of the optical disc by a linear motor performs recording, reproducing and erasing. Among the conventional optical disc devices, a device is proposed in which a tracking differential signal is fed back to the linear motor in order to track data recorded in a spiral shape. However, in the optical disc device of this type, an error signal may then be supplied to the linear motor and accurate tracking cannot then be performed. Another device is proposed in which data is tracked by the movement of a movable lens within an optical head and the movement of an optical head driven by a linear motor. In the device of this type, the movable lens tracks data from the central position of the optical head to the allowable limit. If data is not sufficiently tracked, the optical head is then driven to cause the movable lens to be positioned at the center of the optical head. Then, the movable lens can track data again. However, in the device of this type, a step pulse is supplied to the linear motor and the device cannot be stably operated at the leading edge of the pulse.

SUMMARY OF THE INVENTION

It is, therefore, an object of the present invention to provide a disc device wherein, when continuous recording, reproducing or erasing is performed, an optical head is driven at a speed equal to a speed (time interval corresponding to displacement of a spiral data recording area by one pitch upon one revolution of a disc) with which the spiral data recording area is displaced in the direction of movement of the optical head in order to constantly position a movable lens at the center of the optical head for further tracking.

In order to achieve the above object of the present invention, there is provided a disc device comprising: a disc having a spiral data recording area; a motor for driving said disc; a head for recording data on said disc, reproducing the data therefrom, and erasing the data thereon; a movable mechanism for radially moving said head on said disc; positioning servo means, connected to said movable mechanism, for controlling and driving said movable mechanism at the same velocity as that at which said spiral data recording area is moved in the direction of movement of said movable mechanism; a tracking servo circuit, connected to said head, for tracking said data recording area; and means for controlling said positioning servo means and said tracking servo circuit and connected thereto.

BRIEF DESCRIPTION OF THE DRAWINGS

Other objects and features of the present invention will be apparent from the following description taken in connection with the accompanying drawings in which:

FIG. 2B is a block diagram of the tracking servo circuit of the disc device shown in FIG. 1.

DETAILED DESCRIPTION OF THE PREFERRED EMBODIMENT

Figure 1:
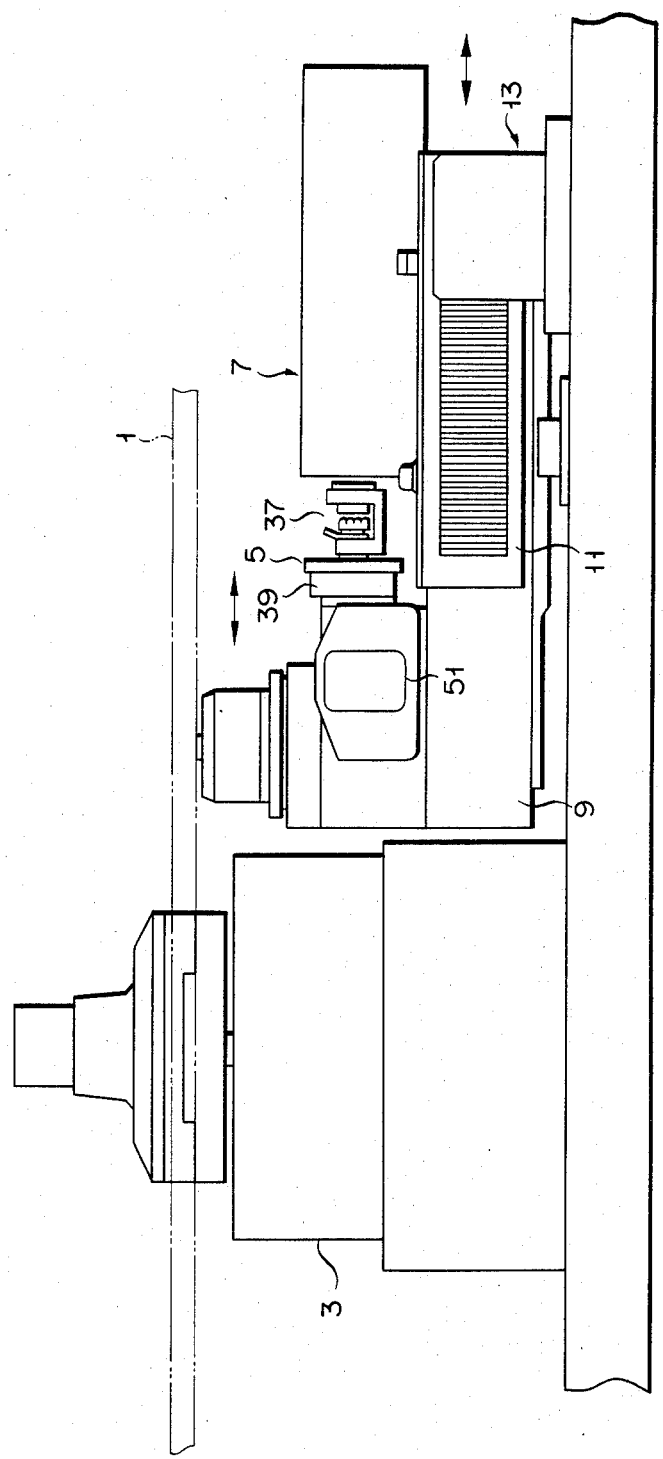
FIG. 1 is a front view of a mechanism of a disc device according to one embodiment of the present invention.

Referring to FIG. 1, an optical disc 1 has a spiral data recording area of a radially constant pitch and is driven by a motor 3. An optical head 5 records data on the optical disc 1 and reproduces it therefrom. The optical head 5 is mounted to a movable portion 9 of a DC linear motor (moving mechanism) 7 which further includes a stationary portion. Upon movement of the movable portion 9, the optical head 5 is linearly radially moved on the optical disc 1. An optical scale 11 is fixed at the movable portion 9. A detector 13 detects the position of the optical scale 11. The detector 13 detects the position by the so-called overlapped lattice detection system upon movement of the movable portion 9 (movement of the optical head 5). The detector 13 then generates two kinds of signals of different phases.

A positioning servo circuit 15 of the linear motor 7 drives the linear motor 7 in accordance with a target position signal supplied from an external device and the output signals from the detector 13, or in accordance with whether the optical head 5 is in the tracking state.

The positioning servo circuit 15 includes a selecting circuit 17, a velocity detecting circuit 19, an address pulse generating circuit 21, analog switches 23 and 25, a multiplexer 35, a D/A converter 27, a counter 33, a differential amplifier 29 and a driver 31.

The selecting circuit 17 is connected to the detector 13 through two preamplifiers 16 and 18. The selecting circuit 17 selectively combines the two signals of different phases produced from the detector 13 and generates the position signal in accordance with the overlapped lattice type detection system. The velocity detecting circuit 19 is also connected to the detector 13 through the preamplifiers 16 and 18 and generates a velocity signal by differentiating the output signals from the detector 13. The address pulse generating circuit 21 is also connected to the detector 13 through two preamplifiers 16 and 18 and supplies the position pulse to a control circuit 77 to be described later in accordance with two signals of different phases from the detector 13. The analog switches 23 and 25 are connected to the selecting circuit 17 and to the velocity detecting circuit 19, respectively. The analog switches 23 and 25 selectively transmit the output signals from the selecting circuit 17 and the velocity detecting circuit 19 on the basis of a control signal from the control circuit 77. The control circuit 77 is connected to the multiplexer 35. The multiplexer 35 receives an operation signal from the control circuit 77 and an output signal from the counter 33 and selectively outputs these signals to a D/A converter 27 connected to the multiplexer 35. The counter 33 is connected to the motor 3 and counts a rotation synchronizing clock signal generated from the motor 3 to be supplied to the multiplexer 35. When data on the optical disc 1 is sequentially accessed, the control circuit 77 controls the multiplexer 35 to select the output signal from the counter 33. However, if data on the optical disc 1 is accessed at random, the control circuit 77 controls the multiplexer 35 to select the signal therefrom. The D/A converter 27 supplies an analogue signal to one input terminal of the differential amplifier 29. The analogue signal is a reference position signal from the counter 33 of which varying velocity is equal to one at which data recording area is moved in the movement direction of the linear motor 7 when data on the optical disc 1 is sequentially accessed, or a velocity curve signal when data on the optical disc 1 is accessed at random. The output signal from the selecting circuit 17 or the velocity detecting circuit 19 is supplied to the other input terminal of the differential amplifier 29 through the analog switches 23 and 25. The differential amplifier 29 subtracts the position signal from the selecting circuit 17 or the velocity signal from the velocity detecting circuit 19 as controlled variable from the analogue signal from the D/A converter 27 as desired value and supplies a differential signal i.e. a controlled deviation to the driver 31. The driver 31 drives the linear motor 7 in accordance with the differential signal from the differential amplifier 29.

Figure 2A:
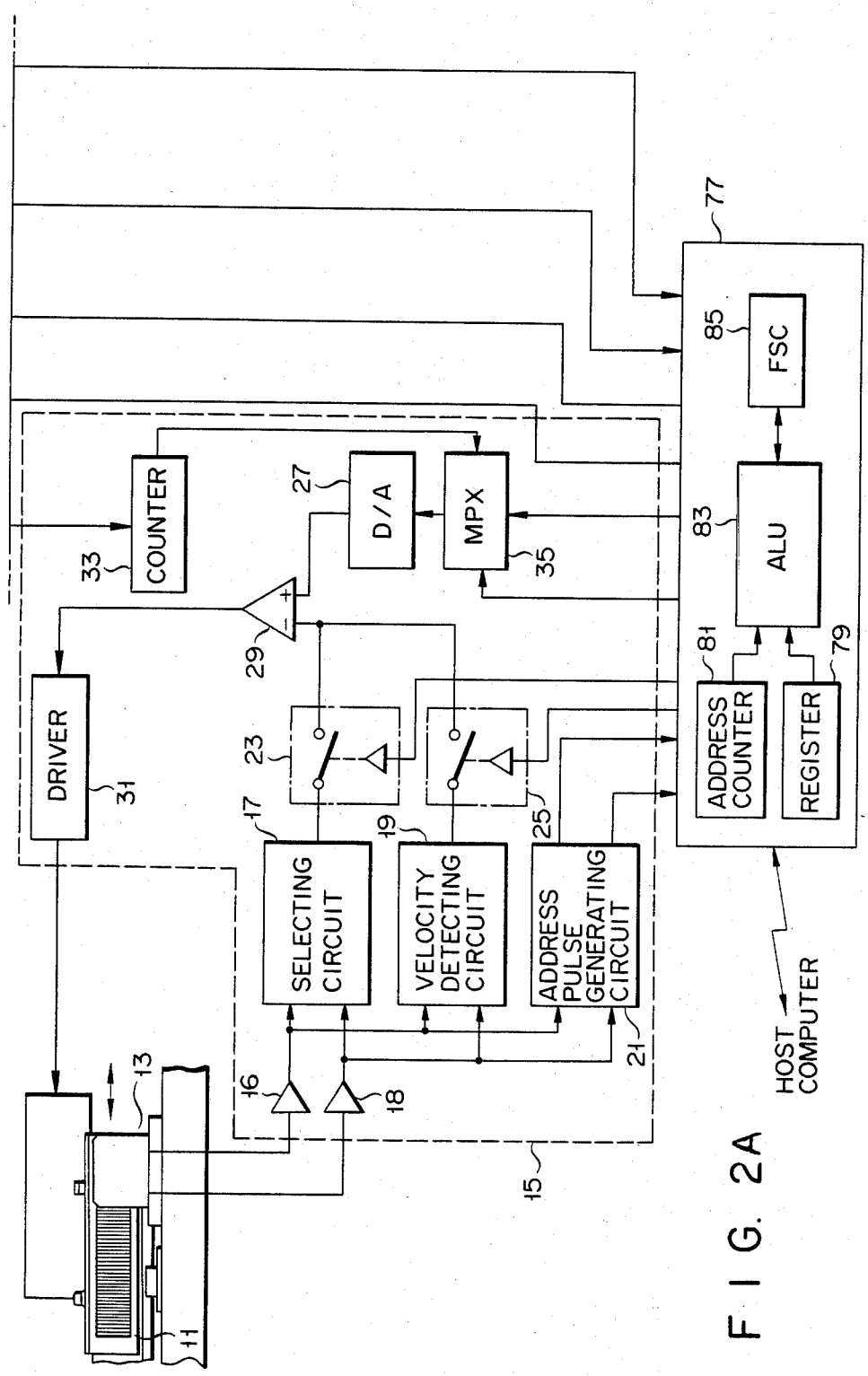
FIG. 2A is a block diagram of the positioning servo circuit portion of the disc device shown in FIG. 1.

As shown in FIG. 2B, the optical head 5 fixed at the movable portion of the linear motor 7 comprises a semiconductor laser generator 37, a collimator lens 39, a polarization beam splitter 41, a λ/4 plate 43, a movable objective lens 45, a condensing lens 49, a photodetector 51 and drive coils 47. The laser generator 37 is controlled by a beam control/drive circuit (not shown). A laser beam can be switched to two power beams, a recording laser beam and a reproducing laser beam. The laser beams from the laser generator 37 are converted to parallel beams by the collimator lens 39 and guided to the movable objective lens 45 through the polarization beam splitter 41 and the λ/4 plate 43. The laser beams are focused to a spot of about 1 μm in diameter and radiated on the front (back) surface of the optical disc 1. The movable objective lens 45 is moved by the drive coils 47 as needed. The reflected light beam from the optical disc 1 is guided to the focusing lens 49 through the movable objective lens 45, the λ/4 plate 43 and the polarization beam splitter 41 and focused on the photodetector 51. The photodetector 51 then converts the incident light beam to an electric signal. The output from the photodetector 51 (sensor for detecting two split beams) is supplied to a signal processing circuit (not shown) and used for reproduction, focusing control or tracking control.

The output from the photodetector 51 is supplied to a tracking servo circuit 53. The tracking servo circuit 53 drives the drive coils 47 of the movable lens 45 in accordance with the output signal from the photodetector 51. The movable lens 45 is then moved in the direction indicated by an arrow to perform proper tracking and a tracking jump. The tracking servo circuit 53 comprises a differential amplifier 55, an adder 69, a phase compensating circuit 57, a track jump pulse generator 59, analog switches 61 and 63, and an amplifier 65. The differential amplifier 55 and the adder 69 are respectively connected to the photodetector 51 through preamplifiers 54 and 56, and receive the electric signal from the photodetector 51. The differential amplifier 55 supplies a differential signal to the phase compensating circuit 57. The adder 69 generates a sum signal to a digitizer 71. The phase compensating circuit 57 compensates the phase of the differential signal generated from the differential amplifier 55 in order to prevent oscillation of the movable lens 45. An output from the phase compensating circuit 57 is supplied to the amplifier 65 transmitted through the analog switch 61. Meanwhile, the track jump pulse generator 59 generates a signal which indicates one-track jump. The output from the track jump pulse generator 59 is supplied to the amplifier 65 through the analog switch 63. These analog switches 61 and 63 are controlled by the control signal from the control circuit 77. Further, the output signal from the amplifier 65 is supplied to the drive coils 47.

The reproduction signal detected by the photodetector 51 is supplied to the adder 69. The output signal from the adder 69 is supplied to the digitizer 71. The binary coded signal from the digitizer 71 is supplied to a decoder 75 through a buffer 73. The decoder 75 decodes the signal from the digitizer 71 to form address data (track number) and supplies the data to the control circuit 77.

The control circuit 77 controls the device as a whole. The control circuit 77 comprises a register 79 for storing the target track number from an external device (not shown) such as a host computer, an up-down counter 81 as an address counter for incrementing/decrementing the address pulse from the address pulse generator 21, an arithmetic logic unit 83 for calculating the difference between the count value of the counter 81 and the target position signal from the register 79, a function generator 85 and so on. The control circuit comprises a microcomputer such as 8-bit microcomputer 8085A by Intel.

The control circuit 77 controls the linear motor 7 in accordance with the difference between the playback track number supplied from the decoder 75 and the target track number and further controls the movable lens 45 to perform track jump and proper tracking.

The mode of operation of the disc device with the above arrangement will be described. Assume that the target track number is supplied from the host computer to the control circuit 77 and that the target track number is stored in the register 79 in the control circuit 77. The arithmetic logic unit 83 subtracts the target address information derived from the track number from the current position information produced from the counter 81. The differential signal is supplied to the function generator 85. The function generator 85 generates a velocity reference signal corresponding to the difference to the multiplexer 35. The control signal generated from the control circuit 77 is supplied to the analog switch 25 which is then turned on. The multiplexer 35 selectively outputs the velocity reference signal having a predetermined velocity curve from the control circuit 77 to the D/A converter 27 in accordance with the control signal from the control circuit 77. This velocity reference signal, together with the velocity feedback signal supplied from the velocity detecting circuit 19 through the analog switch 25, are supplied to the differential amplifier 29. The differential amplifier 29 generates a signal in accordance with the difference between the velocity reference signal and the velocity curve signal. The output signal from the differential amplifier 29 is supplied to the driver 31. The driver 31 drives the linear motor 7 to reach the movable portion 9 (optical head 5) of the linear motor 7 to the target position in accordance with the velocity reference signal from the D/A converter 27. When the movable portion 9 reaches the target position, the control circuit 77 turns the analog switch 23 on and keeps the output signal from the D/A converter 27 at the constant level. As a result, the differential signal between the position signal from the selecting circuit 17 and the constant level signal from the D/A converter 27 is output from the differential amplifier 29 and supplied to the driver 31. The movable portion 9 is positioned properly. In other words, the movable portion 9 is electrically locked by the positioning servo system.

The track number at the locking position is read by the optical head 5. The laser beams from the laser generator 37 are collimated by the collimator lens 39 and reflected by the polarization beam splitter 41 toward the optical disc 1. The polarized laser beams are focused by the movable lens 45 through the λ/4 plate 43 and radiated as a spot on the predetermined position on the optical disc 1. The reflected light beam from the optical disc 1 is focused on the light-receiving surface of the photodetector 51 through the movable lens 45, the λ/4 plate 43, the polarization beam splitter 41 and the condensing lens 49. The focused light beam is then converted to an electric signal. The detecting signals electrically converted in the photodetector 51 are added for the increase of modulation and avarage effect and converted to a binary coded signal in the digitizer 71. The binary coded signal is buffered in the buffer 39 and decoded in the decoder 75. The decoded signal is supplied to the control circuit 77 as address data (track number). The control circuit 77 compares the playback track number and the target track number in the register 79. If their difference corresponds to, for example 10 tracks or more, the linear motor 7 is driven again in response to the differential signal from the control circuit 83 as described above. However, if the difference is within 10 tracks, the movable lens 45 is driven in response to the pulse from the track jump pulse generator 59. Therefore, the laser beam is radiated on the target track. When the analog switch 61 is turned off and the analog switch 63 is turned on, the track jump pulse is supplied to the amplifier 65. The drive coils 47 of the movable lens 45 are driven in response to the amplifier 65 and the movable lens 45 is moved to jump the laser beam to the desired track. Then, the analog switch 61 is turned on in accordance with the control signal from the control circuit 77. As a result, the detection signal from the photodetector 51 through the preamplifier 54 and the differential amplifiers 55 is selected as the position error signal. This signal is thus compensated in the phase compensating circuit 57 and then amplified in the amplifier 65. The amplified signal is supplied to the drive coils 47. As a result, the drive coils 47 drive the movable lens 45 to perform proper position error detection and proper tracking. The optical head 5 records data on the optical disc 1 or erases it in the same manner as described above.

In order to move the optical head 5 to a predetermined (target) track, the linear motor 7 is driven to the predetermined track until address data by the optical scale 11 coincides with the target address information calculated from the track number. If this coincidence is obtained, the track number of a track on which the optical disc 1 is currently positioned is compared with the target track number. If their difference is 10 tracks or more, the linear motor 7 is driven in accordance with the difference with reference to the optical scale 11. However, if the difference is within 10 tracks, the movable lens 45 is moved to the target track by skipping the tracks which correspond to the difference. Thus, the laser beam emitted from the optical head 5 is positioned on the target track. Tracking control of the laser beam within the optical head 5 is kept at the minimum. In other words, the position of the movable lense 45 is constantly stably positioned at the center of the movable range having the servo allowance of the optical head. Further, since the linear motor is used to move the movable portion in the vicinity of the target track, a time interval at which the optical head 5 reaches the target track is shortened. The optical head 5 can be moved to the target track quickly and stably regardless of changes in temperature and humidity.

Continuous reproduction of data recorded on the optical disc after the optical head 5 is positioned on the target track will be described. The control circuit 77 supplies the control signal to the multiplexer 35 so that the multiplexer 35 selects the reference position signal from the counter 33 of which varying velocity is equal to one at which data recording area is moved in the movement direction of the linear motor 7. The control circuit 77 further supplies the control signal to the analog switches 23, 25. Therefore, the D/A converter 27 converts the reference position signal from the counter 33 to analog data and supplies it to the differential amplifier 29. The differential amplifier 29 also receives the position feedback signal from the selecting circuit 17 through the analog switch 23. The differential amplifier 29 then supplies the controlled deviation of the position to the driver 31. The driver 31 then drives the linear motor 7 to the position corresponded to the reference position signal. The linear motor 7 is thus moved at the same velocity as that at which the data recording area is moved in the movement direction of the linear motor 7. As a result, the optical head 5 is moved so that the movable lens 45 is set to be positioned at the center of the head 5. The analog switch 61 is ON in response to the control signal from the control circuit 77. Therefore, data recorded in spiral shape are reproduced while being tracked. The optical head 5 is then moved and the movable lens 45 is positioned in the vicinity of the center of the optical head 5. The optical head 5 records data on the optical disc 1 or erases it in the same manner as described above.

Since the linear motor 7 is driven at the same velocity at which the data recording area is rotated, the movable lens need not compensate for the radial movement of the data recording area. Therefore, the movable lens can be positioned at the center of the movable range which may include a large tolerance. Even if external disturbance which leads to the disable of tracking in the conventional type is given to the disc device, tracking the data recording area can be performed easily. Further, since the spiral pitch of the data recording area is constant, the optical head can continuously stably track the data recording area.

In the above embodiment, the optical disc is used as a disc. However, a magnetic disc may also be used.

Furthermore in the above embodiment, the constant linear velocity has been considered in the data recording. Thus, the rotation synchronized signal from the motor 3 is supplied to the input terminal of the counter 33. The output signal from the counter 33 is converted by a D/A converter to produce a reference position signal as the desired value of which varying velocity is equal to one at which data recording area is moved in the movement direction of the linear motor 7. The servo system with the position signal using the feedback signal has been adopted.

However, when a constant angular velocity is considered in the data recording, a servo system with the velocity signal may be adopted using a constant reference velocity signal as the desired value, which corresponds to the velocity at which data recording area is moved in the direction of radius of the optical disc 1 since the velocity is constant, at which data recording area is moved in the movement direction of the linear motor 7 in arbitrary positions of the disc 1.

What is claimed is:

1. A device for recording data on and/or reading data from a disc having a recording area on which data can be recorded/read in the form of tracks arranged in a spiral, comprising:

means for driving said disc;
   a head for recording data on said disc and/or reproducing the data therefrom;
   a movable mechanism for moving said head radially with respect to said disc;
   a tracking servo circuit, connected to said head, for controlling said head to be positioned with respect to a desired one of said tracks for recording/reading data on/from said disc;
   positioning servo means, connected to said movable mechanism, for controlling and driving said movable mechanism at the same velocity as a velocity at which said spiral data recording area is moved in the movement direction of said movable mechanism for controlling said head so as to accurately be aligned with respect to the desired track selected by said tracking servo circuit; and
   means for controlling said positioning servo means and said tracking servo circuit;
   wherein said positioning servo means comprises:
   (a) a selecting circuit for receiving a detection signal from a detector which detects movement of said movable mechanism and for producing a position signal indicative of the position of said movable mechanism;
   (b) a velocity detecting circuit, connected to said detector, for receiving the detection signal, for differentiating the detection signal, and for producing a velocity signal indicative thereof;
   (c) an address pulse generator, connected to said detector, for generating address pulses for transmission to said controlling means in response to the detection signal;
   (d) counting means for producing a reference position signal in response to a rotation synchronizing clock signal from said driving means;
   (e) means for generating a differential signal between the position signal from said selecting circuit or the velocity signal from said velocity detecting circuit and the reference position signal from said counting means or a reference velocity signal from said controlling means; and
   (f) driver means for driving said movable mechanism in response to the differential signal.

2. A disc device according to claim 1, further comprising:

(a) switching means for selecting either the position signal from said selecting circuit or the velocity signal from said velocity detecting circuit for coupling to said differential signal generating means; and
   (b) selecting means for selecting either the reference position signal from said counting means or the reference velocity signal from said controlling means for coupling to said differential signal generating means.

3. A disc device according to claim 2, wherein said controlling means comprises a microprocessor having an input connected to said address pulse generator, and outputs for controlling said switching means and said selecting means.

4. A disc device according to claim 3, wherein said microprocessor comprises:

a register for temporarily storing address data which indicates a target position and which is entered by an external unit;
   an address counter for counting the address pulses from said address pulse generator and for producing current position data;
   an arithmetic logic unit, connected to said register and said address counter, for subtracting the address data stored in said register from the current position data produced from said address counter so as to output a differential signal; and
   a function generator, connected to said arithmetic logic unit, for generating the reference velocity signal in response to the differential signal from said arithmetic logic unit.

* * * * *